US011617312B2

(12) United States Patent
Zhou et al.

(10) Patent No.: US 11,617,312 B2
(45) Date of Patent: Apr. 4, 2023

(54) BACKPACK TOOL APPARATUS

(71) Applicant: Globe (Jiangsu) Co., Ltd., Jiangsu (CN)

(72) Inventors: Daoyin Zhou, Jiangsu (CN); Yunjie Shangguan, Jiangsu (CN)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 559 days.

(21) Appl. No.: 16/499,455

(22) PCT Filed: Mar. 30, 2017

(86) PCT No.: PCT/CN2017/078687
§ 371 (c)(1),
(2) Date: Nov. 12, 2019

(87) PCT Pub. No.: WO2018/176295
PCT Pub. Date: Oct. 4, 2018

(65) Prior Publication Data
US 2020/0383281 A1 Dec. 10, 2020

(51) Int. Cl.
*A01G 20/47* (2018.01)
*F04D 25/06* (2006.01)
(Continued)

(52) U.S. Cl.
CPC .............. *A01G 20/47* (2018.02); *E01H 1/08* (2013.01); *F04D 25/0673* (2013.01); *F04D 25/08* (2013.01); *F04D 25/16* (2013.01)

(58) Field of Classification Search
CPC ...... F04D 25/0673; F04D 25/08; F04D 25/16; E01H 1/08; E01H 1/0809; E01H 1/0863; E01H 5/10; A01G 20/47; A47L 5/14
See application file for complete search history.

(56) References Cited

U.S. PATENT DOCUMENTS

| 4,483,070 A | 11/1984 | Junkermann |
| 7,600,290 B1 * | 10/2009 | Peters ...................... A47L 5/36 |
| | | 15/327.5 |

(Continued)

FOREIGN PATENT DOCUMENTS

| CN | 201346182 Y | 11/2009 |
| CN | 105714719 A | 6/2016 |

(Continued)

OTHER PUBLICATIONS

Search Report and Written Opinion in related International Patent Application No. PCT/CN2017/078687 dated Dec. 7, 2017; 13 pages.

(Continued)

*Primary Examiner* — Dominick L Plakkoottam
(74) *Attorney, Agent, or Firm* — Rooney IP, LLC

(57) ABSTRACT

A backpack tool kit including a backpack assembly with a casing and a battery pack received in the casing; and at least one tool connected to the casing of the backpack assembly and electrically connected to the battery pack. The backpack tool apparatus can be provided with multiple tools to simultaneously realize different operations and functions. Moreover, the tools are configured to be detachably connected to the backpack assembly, and can be replaced with different tools to realize different operations and functions according to needs.

8 Claims, 17 Drawing Sheets

(51) Int. Cl.
    *F04D 25/08*     (2006.01)
    *E01H 1/08*     (2006.01)
    *F04D 25/16*     (2006.01)

(56)     References Cited

U.S. PATENT DOCUMENTS

| | | |
|---|---|---|
| 8,671,516 B1 | 3/2014 | Mendez |
| 9,277,844 B1 * | 3/2016 | Millan .................... A47L 9/244 |
| 10,039,367 B2 | 8/2018 | Yamaoka et al. |
| 10,980,193 B2 * | 4/2021 | Shangguan ........... F04D 27/004 |
| 2012/0210585 A1 | 8/2012 | Gieske et al. |
| 2016/0345714 A1 * | 12/2016 | Yamaoka ................. B25F 5/02 |
| 2017/0273251 A1 * | 9/2017 | Haramoto ............... F04D 25/16 |
| 2018/0094393 A1 * | 4/2018 | Takahashi ............... F04D 25/08 |
| 2018/0146628 A1 | 5/2018 | Huo et al. |
| 2018/0206620 A1 | 7/2018 | Yamaoka et al. |
| 2019/0045725 A1 * | 2/2019 | Shangguan ............ A01G 20/40 |

FOREIGN PATENT DOCUMENTS

| | | |
|---|---|---|
| CN | 106149603 A | 11/2016 |
| CN | 106192834 A | 12/2016 |
| EP | 3225098 A1 | 5/2019 |
| EP | 3225099 B1 | 5/2019 |

OTHER PUBLICATIONS

China National Intellectual Property Administration, Office Action in related Chinese Patent Application No. 201780089048.6 dated Jan. 6, 2021; 13 pages.
European Patent Office, Search Report in related European Application No. 17903128.1 dated Jun. 24, 2020; 14 pages.

* cited by examiner

BACKPACK TOOL APPARATUS

TECHNICAL FIELD

The present invention relates to the field of garden tools, and in particular to a backpack tool apparatus.

BACKGROUND ART

Existing garden tools, such as a blower, leaf suction machine, hay mower, can perform different functions. In addition, in order to reduce the operator's arm force, a backpack structure can be adopted to carry the tool.

However, there are still many problems with the existing tools, such as simple function, non-detachable, and low universality.

That's why a new type of working tool should be proposed.

SUMMARY OF INVENTION

The problem solved by this invention is to provide a new working tool.

To solve the above problem, the embodiment of this invention provides a backpack tool apparatus, comprising: a backpack assembly, comprising a casing and a battery pack received in the casing; as well as at least one tool, connected to the casing of the backpack assembly and electrically connected to the battery pack.

In some embodiments, said tool is suitable to be detachably connected to the casing of the backpack assembly.

In some embodiments, said tool is pluggable connected to said backpack assembly by a guide rail and a guide groove; when said guide rail is inserted into said guide groove, said tool is mounted on said backpack assembly; and said tool is detached from said backpack assembly when said guide rail is pulled out of said guide groove.

In some embodiments, there are two tools, and the guide groove or the guide rail is disposed on both the left and right side of the backpack assembly, said two tools are respectively detachably connected to both sides of said backpack assembly.

In some embodiments, said guide groove or guide rail is disposed on both the left and right side of said backpack assembly, suitable to be respectively detachably connected to the left and right side of said backpack assembly.

In some embodiments, said guide groove is disposed on said backpack assembly, and said guide groove extends laterally or longitudinally; or said guide rail is disposed on said backpack assembly, and said guide rail extends in a lateral direction or longitudinal direction.

In some embodiments, said tool further comprising a locking part, to fix the relative position of said tool and said backpack assembly when the guide rail is inserted into said guide groove.

In some embodiments, said locking part comprises: a locking protuberance and a locking groove, respectively disposed on said tool and said backpack assembly, and said locking protuberance is received in said locking groove when said guide rail is inserted into the guide groove to fix the relative position between said tool and said backpack assembly.

In some embodiments, said locking part further comprises: a release button, to drive the locking protuberance to separate from said locking groove.

In some embodiments, a male and female plug are respectively equipped on said backpack assembly and said tool, and when said guide rail is inserted into said guide groove, said male plug is in contact with said female plug to electrically connect said battery pack and said tool.

In some embodiments, said tool is equipped with said guide groove or the guide rail, as well as said male plug or female plug for externally connecting a battery pack.

In some embodiments, said tool is configured as: a blower, a leaf suction machine, a grass cutter or a chain saw.

The embodiment of this invention provides a backpack tool apparatus, comprises: a backpack assembly, a first tool and a second tool, the backpack assembly includes a casing and a battery pack received in said casing, the first tool and second tool are connected to the casing of said backpack assembly, and electrically connected to the battery pack.

In some embodiments, said first tool is configured as: a blower, a leaf suction machine, a grass cutter or a chain saw; and said second tool is configured as: a blower, a leaf suction machine, a grass cutter or a chain saw.

In some embodiments, said first tool is configured as: a blower, to blow outward; said second tool is configured as: a leaf suction machine, to suck up from outside.

In some embodiments, both said first tool and said second tool is configured as a blower, and the first tool is configured as a high-speed blower, said second tool is configured as a high-volume blower.

In some embodiments, at least one of said first tool and said second tool is detachably connected to the backpack assembly.

In some embodiments, at least one of said first tool and said second tool is pluggable connected to the backpack assembly by a guide rail and a guide groove.

In some embodiments, at least one of said first tool and said second tool is connected to said backpack assembly by a distance adjusting assembly, which is applicable to adjust the distance between said first tool and said backpack assembly and/or said second tool and said backpack assembly.

The embodiment of this invention provides a backpack tool apparatus, comprises: a backpack assembly, comprising a casing and a battery pack received in the casing; a first blower, connected to said casing of said backpack assembly and is electrically connected to the battery pack, and said first blower comprising: a first axial flow fan and a first blowpipe component, said first axial flow fan blows outward through the first blowpipe component; and a second blower, connected to said casing of said backpack assembly and is electrically connected to the battery pack, and said second blower comprising: a second axial flow fan and a second blowpipe component, said second axial flow fan blows outward through the second blowpipe component.

In some embodiments, said first blower and said second blower are respectively equipped on the left and right side of said backpack assembly.

In some embodiments, said first blower is equipped with: a first controller component, to control the wind speed and volume of said first blower; said second blower is equipped with: a second controller component, to control the wind speed and volume of said second blower.

In some embodiments, the maximum output power of said first axial flow fan and said second first axial flow fan are different.

In some embodiments, the diameter of the air outlet pipe of the first blowpipe component is set to 70-80 mm.

In some embodiments, the diameter of the air outlet pipe of the second blowpipe component is set to 60-70 mm.

In some embodiments, said battery pack comprises a first battery pack and a second battery pack, the first battery pack is electrically connected to the first blower, and said second battery pack is electrically connected to the second blower.

In some embodiments, said first battery pack and said second battery pack are connected in series or parallel.

In some embodiments, at least one of said first blower and said second blower is detachably connected to the casing of said backpack assembly.

In some embodiments, at least one of said first blower and said second blower is connected to the casing of said backpack assembly by a distance adjusting assembly, which is applicable to adjust the distance between said first blower and said backpack assembly and/or said second blower and said backpack assembly.

The embodiment of this invention provides a backpack tool apparatus, comprises: a backpack assembly, comprising a casing and a battery pack received in the casing; a blower, connected to the casing of the backpack assembly and electrically connected to the battery pack, to blow outward; and a leaf suction machine, connected to the casing of the backpack assembly and electrically connected to the battery pack, to suck up foreign objects.

In some embodiments, said blower is configured as an axial-flow type or centrifugal type.

In some embodiments, said leaf suction machine is configured as an axial-flow type or centrifugal type.

In some embodiments, said leaf suction machine is further equipped with a blade, to chop the foreign objects sucked up.

In some embodiments, said leaf suction machine is further equipped with a collection bag, to collect the foreign objects sucked up.

In some embodiments, said leaf suction machine comprises: an axial flow fan, a blade and a collecting bag, wherein said blade is disposed upstream of said axial flow fan according to the air flow direction, and said collecting bag is disposed downstream of said axial flow fan.

In some embodiments, said leaf suction machine comprises: a centrifuge flow fan, a blade and a collecting bag, wherein said blade is disposed upstream of said centrifuge flow fan according to the air flow direction, and said collecting bag is disposed downstream of said blade.

The embodiment of this invention provides a backpack tool apparatus, comprises: a backpack assembly; a tool; and a distance adjusting assembly, the tool is connected to the backpack assembly by said distance adjusting assembly, said distance adjusting assembly is applicable to switch said tool between at least a first position and a second position.

In some embodiments, said distance adjusting assembly composes: a neck part, an adjustable part, a driving part, and a resetting part; said neck part is formed with at least a first groove and a second groove; a protrusion formed on the adjustable part, the protrusion being received in the first groove to fix the tool in the first position; said driving part is applicable to drive the adjustable part moving to disengage the protrusion on the adjustable part from said first groove; when the protrusion on said adjustable part is disengaged from said first groove, the tool can move relatively to the backpack assembly such that the protrusion on the adjustable part is aligned with a second groove on the neck part; the resetting part can drive the driving part to be reset such that said protrusion on the adjustment part is received within the second groove to secure the tool to the second position.

In some embodiments, said adjustable part is configured as a rotatable structure; said driving part is configured to be a driving button which is connected on the adjustable part; when the driving button is pressed, the adjustable part is rotated to enable the protrusion on the adjustment part to disengage from said first groove.

In some embodiments, said driving button is provided on the backpack assembly.

In some embodiments, said adjustable part is configured as a movable structure; the driving part is configured as a driving rod, the first end of the driving rod abuts on the adjustable part, and the second end is provided with a driving button; said driving rob moves when said driving button is pressed, to make said protrusion on the adjustable part disengaging from said first groove.

In some embodiments, said driving button is provided on the backpack assembly.

In some embodiments, said adjustable part is configured as a movable structure; the driving part is configured as a driving button, said driving button is connected with said adjustable part; said adjustable part moves when said driving button is pressed, to make said protrusion on the adjustable part disengaging from said first groove.

In some embodiments, said driving button is provided on said tools.

In some embodiments, said resetting part is configured as: a resetting spring, which is disposed against said driving part.

Compared with the prior art, the technical solution of the present invention has the following advantages:

The tool provided by the embodiment of the invention has two tools, which are suitable for simultaneously implementing different operations and functions, and have strong functionality.

Further, when two tools disposed on the carrying component are blowers, one of the blowers may be set as a high-speed blower for removing heavy objects, and the other blower may be set as a high-volume blower to remove extensive debris, the working efficiency of the backpack tool apparatus can be improved. In addition, two blowers arranged on the backpack assembly have their own fans, air ducts and control units and are suitable for independent operation.

Further, the tool can be configured to be detachably connected to the backpack assembly, so that different tools can be replaced to realize different operations and functions according to requirements. Therefore, the backpack assembly provided by the embodiment of the present invention is multi-functional and versatile.

Further, the distance between the tool and the backpack assembly can be adjusted to meet the needs of users with different body type, and to improve the comfortableness of the backpack tool.

DESCRIPTION OF EMBODIMENTS

As described in the background art, the existing backpack tool apparatus has the problems of single function, non-detachable, and low universality.

Given this, the embodiment of this invention provides a backpack tool apparatus, comprises: a backpack assembly, a first tool and a second tool, wherein, said backpack assembly includes a casing and the battery pack received in said casing, said first tool and said second tool are connected to said casing of said backpack assembly, and electrically connected to said battery pack. Therefore, the tool provided by the embodiment of the invention has two tools, which are suitable for simultaneously implementing different operations and functions, and have strong functionality. In addition, the tool can be configured to be detachably connected to the backpack assembly, so that different tools can be replaced to realize different operations and functions according to requirements. Therefore, the backpack assembly provided by the embodiment of the present invention is multi-functional and versatile.

To make the above described objects, features, and advantages of the present invention be more clear and easy to understand, the specific embodiments of the present invention will be described in detail below with reference to the figures.

Figure 1:
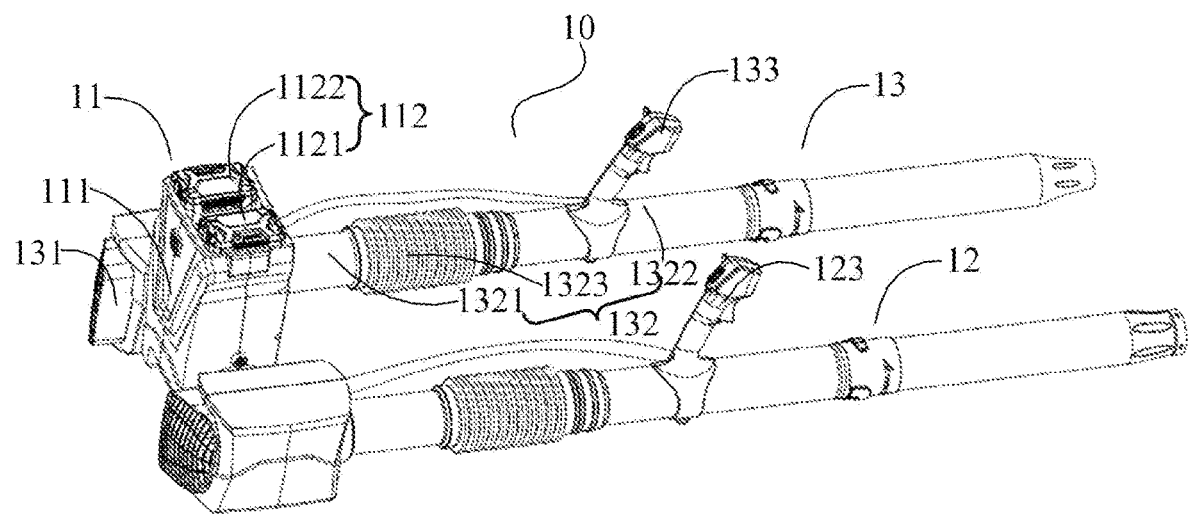
FIG. 1 is a structure diagram of a backpack blower provided by an embodiment of the present invention.
Figure 2:
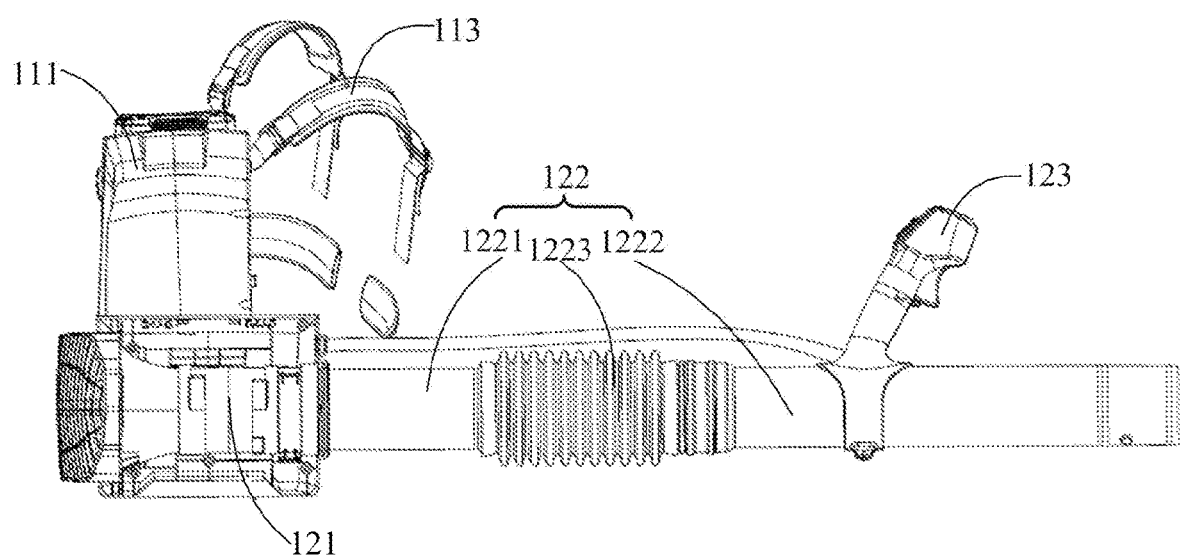
FIG. 2 is a structure diagram of a first blower of a backpack blower provided by an embodiment of the present invention.

Referring to FIGS. 1 and 2, an embodiment of the present invention provides a backpack tool apparatus, and in particular, a backpack blower 10. Said backpack blower 10 includes a backpack assembly 11, a first blower 12, and a second blower 13.

Said backpack assembly 11 comprises: a casing 111 and a battery pack 112. Said casing 111 has a containing chamber, and said battery pack 112 is received in the containing chamber of the casing 111, to supply electric power to the first blower 12 and the second blower 13. In addition, said casing 111 is provided with a strap 113, to carry the casing 111 together with the battery pack 112 accommodated therein through the strap 113.

In some embodiments, said battery pack 112 is disposed in a pluggable mode, that is, the battery pack 112 can be inserted into the casing 111 through an insertion port, or said battery pack 112 can be pulled out from said casing 111 through said insertion port.

In some embodiments, the number of said battery pack 112 is more than one. The battery packs may be connected in parallel or in series. For example, as shown in FIG. 1, the battery pack 112 includes a first battery pack 1121 and a second battery pack 1122, and said first battery pack 1121 and said second battery pack 1122 can be connected together in series, and they can also be connected together in parallel.

In some embodiments, said first battery pack 1121 is electrically connected to the first blower 12 to provide a power source for said first blower 12. Said second battery pack 1122 and said second blower 13 are electrically connected to provide a power source for said second blower 13. At the same time, said first blower 12 and said second blower 13 have respective power sources. In some embodiments, said first blower 12 and said second blower 13 can also be configured to share the same battery pack. In other words, said first blower 12 and said second blower 13 can be powered by a shared battery pack or by two separate battery packs.

In some embodiments, said battery pack 112 can be set to a rechargeable mode.

In some embodiments, said first blower 12 and second blower 13 are connected to the right and left sides of the casing 111 of the backpack assembly 11, respectively. It should be noted that "left side" and "right side" as used herein mean that when the backpack assembly 11 is carried on the user's body, the left hand side of the user is "left side".", the right hand side is the "right side." Thus, when in use, the user can hold the first blower 12 in the right hand and the second blower 13 in the left hand to perform the blowing operation.

In some embodiments, said first blower 12 and/or second blower 13 are fixed connected to the right and left sides of the casing 111 of the backpack assembly 11, respectively. In some embodiments, said first blower 12 and/or second blower 13 can also be configured to detachably connected to the right and left sides of the casing 111 of the backpack assembly 11, respectively.

In some embodiments, said first blower 12 and/or second blower 13 are fixed connected to the right and left sides of the casing 111 of the backpack assembly 11 respectively by welding.

In some embodiments, when said first blower 12 and second blower 13 can also be configured to detachably connected to the casing 111 of the backpack assembly 11, the specific implementation thereof will be explained in detail in the following embodiments.

In some embodiments, the distances between said first blower 12 and/or said second blower 13 and the left and right side of said backpack assembly 11 are adjustable. In this way, the distance between the first lower 12 and the second blower 13 can be adjusted to meet the needs of users of different body types, and the comfortableness of the backpack blower 10 can be improved. The specific implementation thereof will be explained in detail in the following embodiments.

In some embodiments, the first blower 12 comprises a first axial fan 121 and said first blowpipe component 122 is applicable to blow outward through said first blowpipe component 122. Specifically, the first axial flow fan 121 is electrically connected to the battery pack 112 and is adapted to convert electrical energy provided by the battery pack 112 into mechanical energy and output airflow. The air outlet of the first axial flow fan 121 is connected to the air inlet pipe 1221 of the first blow pipe assembly 122, so that the airflow output by the first axial flow fan 121 can enter the air inlet pipe 1221 from the air outlet and flows out of the air outlet pipe 1222 of the first blowpipe component 122 to blow outward.

In some embodiments, the first blowpipe component 122 further comprises a hose 1223 connecting the air inlet pipe 1221 and the air outlet pipe 1222. Thus, the angle of the air outlet pipe 1222 can be adjusted through the hose 1223 to improve the working coverage of the first blower 12.

In some embodiments, the first axial fan 121 can be configured to adopt a direct current motor. Such as, the first axial fan 121 can be configured to adopt a brushless direct current motor.

Similarly, the second blower 13 may also be configured to comprise: the second axial flow blower 131 and the second blowpipe component 132. The second axial flow fan 131 is electrically connected to the battery pack 112 and is adapted to convert electrical energy provided by the battery pack 112 into mechanical energy and output airflow. The air outlet of the second axial flow fan 131 is connected to the air inlet pipe 1321 of the second blow pipe assembly 132, so that the airflow output by the second axial flow fan 131 can enter the air inlet pipe 1321 from the air outlet and flows out of the air outlet pipe 1322 of the second blowpipe component 132 to blow outward.

In some embodiments, the second blowpipe component 132 can be configured to further comprise a hose 1323 connecting the air inlet pipe 1321 and the air outlet pipe 1322. Thus, the angle of the air outlet pipe 1322 can be adjusted through the hose 1323 to improve the working coverage of the second blower 13.

In some embodiments, the diameter of the air outlet pipe 1222 of the first blowpipe component 122 is set to 70-80 mm. preferably, the diameter range of the air outlet pipe of the first blowpipe component 122 is set to 77 mm.

In some embodiments, the diameter of the air outlet pipe 1322 of the second blowpipe component 132 is set to 60-70 mm. preferably, the diameter range of the air outlet pipe of the second blowpipe component 132 is set to 65 mm.

In some embodiments, the diameters of the air outlet pipe 1222 of the first blowpipe component 122 and the diameters of the air outlet pipe 1322 of the second blowpipe component 132 are the same, such as being configured as 70 mm. In some embodiments, the diameters of the air outlet pipe 1222 of the first blowpipe component 122 and the diameters of the air outlet pipe 1322 of the second blowpipe component 132 are not the same.

In some embodiments, the air outlet tube 1222 of the first blowpipe component 122 is detachable, so that the diameter of the air outlet pipe 1222 can be changed by replacing different air outlet pipes. Similarly, the air outlet pipe 1322 of the second blowpipe component 132 can be set to be detachable, so that the diameter of the air outlet pipe 1322 can be changed by replacing different air outlet pipes.

In some embodiments, the second axial fan 131 can also be configured to adopt a direct current motor. Such as, the second axial fan 131 can be configured to adopt a brushless direct current motor.

In some embodiments, the first blower 12 is further provided with a first controller component 123 to control the wind speed and the air volume of the first blower 12. Said second blower 13 is further provided with a second controller component 133 to control the wind speed and the air volume of the second blower 13.

In some embodiments, the first controller component 123 comprises a first wind speed control button, a first air volume control button, and a first control circuit, wherein the first control circuit is configured as: control the position of the button according to the first wind speed, control the first axial fan 121 to adjust the wind speed of the first blower 12; and control the first axial fan 121 according to the position of the first air volume control button, to adjust the air volume of the first blower 12.

In some embodiments, the first wind speed control button can be switched between two or more positions, i.e. the first controller component 123 can switch the wind speed of the first blower 12 in two or more stop positions (e.g., low, mid, and high).

In some embodiments, the first wind volume control button can also be switched between two or more positions, i.e. the first controller component 123 can switch the wind volume of the first blower 12 in two or more stop positions (e.g., low, mid, and high).

Similarly, in some embodiments, the second controller component 133 comprises a second wind speed control button, a second air volume control button, and a second control circuit, wherein the second control circuit is configured as: control the position of the button according to the second wind speed, control the second axial fan 131 to adjust the wind speed of the second blower 13; and control the second axial fan 131 according to the position of the second air volume control button, to adjust the air volume of the second blower 13.

In some embodiments, the second wind speed control button can be switched between two or more positions, i.e. the second controller component 133 can switch the wind speed of the second blower 13 in two or more stop positions (e.g., low, mid, and high).

In some embodiments, the second wind volume control button can also be switched between two or more positions, i.e. the second controller component 133 can switch the wind volume of the second blower 13 in two or more stop positions (e.g., low, mid, and high).

In some embodiments, the maximum motor power and stop positions of the first blower 12 and the second blower 13 can be configured in accordance with Table 1.

TABLE 1

| | The Maximum Power of the Motor (W) | The Stop Positions | The Power Output of the Motor (W) | Rotational Speed (r/min) | Wind Speed (mph) | Air Volume (cfm) |
|---|---|---|---|---|---|---|
| The First Blower | 1140 | LOW | 40.4 | 10736 | 52 | 159 |
| | | MID | 292.1 | 22396 | 116 | 354 |
| | | HIGH | 524.4 | 26726 | 141 | 429 |
| The Second Blower | 1500 | LOW | 58 | 15422 | 106.67 | 180.4 |
| | | MID | 383.4 | 29391 | 217.6 | 246.6 |
| | | HIGH | 691 | 35210 | 268.9 | 299.7 |

In some embodiments, the positions of the first wind speed control button and the first air volume control button may also be continuously varied to achieve a stepless adjustment of the wind speed and air volume of the first blower 12. The positions of the second wind speed control button and the second air volume control button may also be continuously varied to achieve a stepless adjustment of the wind speed and air volume of the second blower 13.

In some embodiments, such as the embodiment shown in Table 1, the first axial fan 121 of the first blower 12 and the second axial fan 131 of the second blower 13 may be configured as have different maximum output power.

It can be seen that the backpack blower 10 provided by the embodiment of the present invention is provided with two blower (i.e., the first blower 12 and the second blower 13), and the first blower 12 and the second blower 13 have respective axial fans and blowpipe components, as well as respective control devices to achieve different wind speeds and air volumes. Therefore, the backpack blower 10 provided by the embodiment of the invention has the advantages such as high work efficiency, powerful function, wide coverage.

Figure 3:
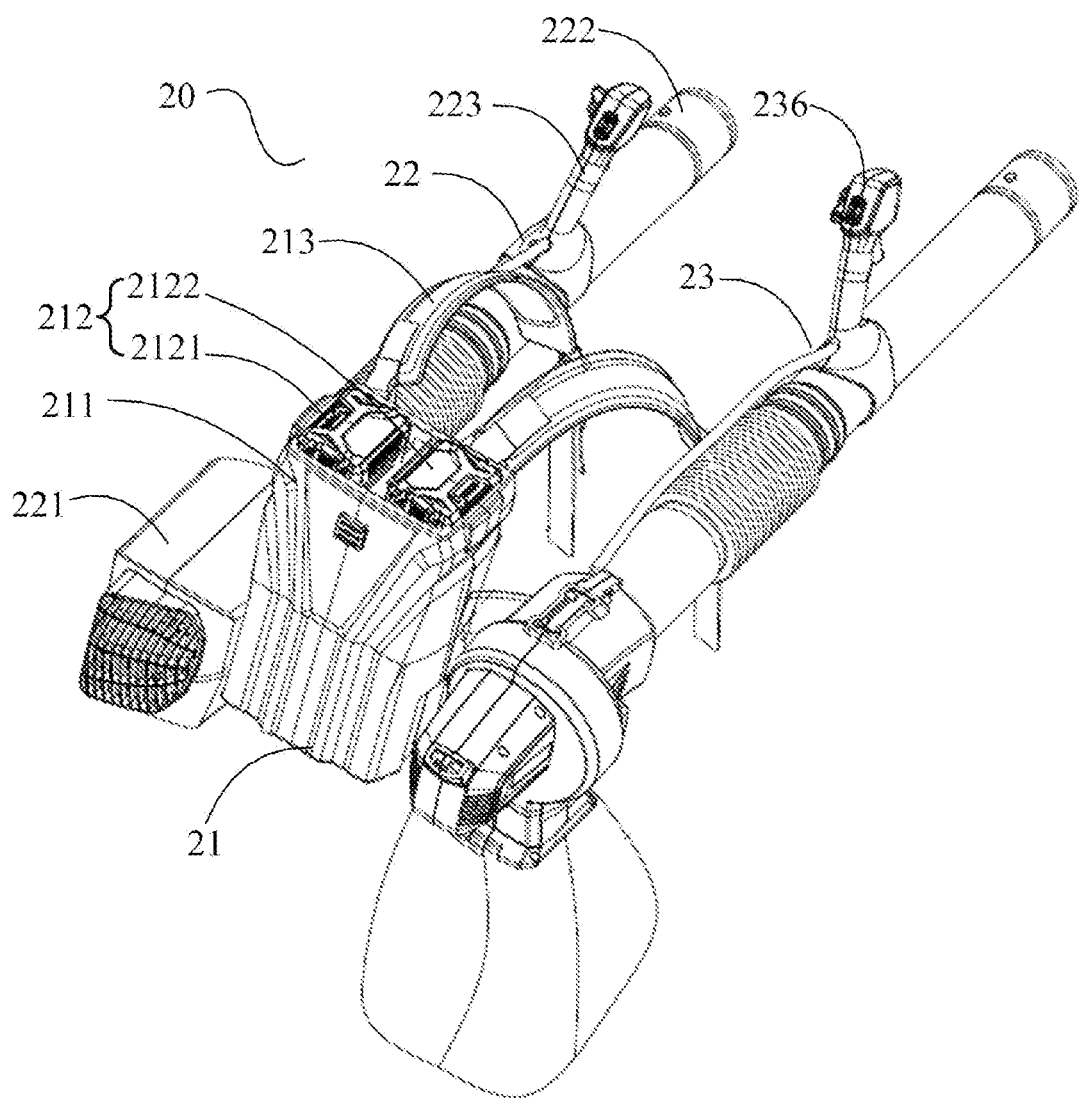
FIG. 3 is a structure diagram of tool of blowing & sucking provided by an embodiment of the present invention.

Referring to FIG. 3, an embodiment of the present invention provides a backpack tool apparatus, and in particular, a blow-suction combined work apparatus 20. Said blow-suction combined work apparatus 20 comprises: a backpack assembly 21, a blower 22 and a leaf suction machine 23.

Said backpack assembly 21 comprises: a casing 211 and a battery pack 212. Said casing 211 has a containing chamber, and said battery pack 212 is received in the containing chamber of the casing 211, to supply electric power. In addition, said casing 211 is provided with a strap 213, to carry the casing 211 together with the battery pack 212 accommodated therein through the strap 213.

In some embodiments, said battery pack 212 is disposed in a pluggable mode, that is, the battery pack 212 can be inserted into the casing 211 through an insertion port, or can be pulled out from said casing 211 through said insertion port.

In some embodiments, said battery pack 212 comprises a first battery pack 2121 and a second battery pack 2122, wherein, said first battery pack 2121 and said blower 22 are electrically connected to provide a power source for said blower 22. Said second battery pack 2122 and said leaf suction machine 23 are electrically connected to provide a power source for said leaf suction machine 23. Therefore, said blower 22 and said leaf suction machine 23 have respective power sources.

In some embodiments, the number of said battery pack 212 can be one, i.e. the blower 22 and the leaf suction machine 23 share the same battery pack. In other words, said blower 22 and said leaf suction machine 23 can be powered by a shared battery pack or by two separate battery packs.

In some embodiments, said battery pack 212 can be set to a rechargeable mode.

Said blower 22 and said leaf suction machine 23 are connected to the right and left side of the casing 211 of the backpack assembly 21, respectively.

In some embodiments, said blower 22 and/or said leaf suction machine 23 are fixed connected to the right and left sides of the casing 211 of the backpack assembly 21, respectively. In some embodiments, said blower 22 and/or said leaf suction machine 23 can also be configured to detachably connected to the right and left sides of the casing 211 of the backpack assembly 21, respectively.

In some embodiments, the distances between said blower 22 and/or said leaf suction machine 23 and the left and right side of said backpack assembly 21 are adjustable. In this way, the distance between the lower 22 and the leaf suction machine 23 can be adjusted to meet the needs of users of different body types, and the comfortableness of the blow-suction combined work apparatus 20 can be improved.

In some embodiments, the blower 22 comprises an axial fan 221 and a blowpipe component 222, said axial fan 221 can blow outward through said blowpipe component 222.

In some embodiments, the blower 22 is provided with an axial flow blower, the specific structure and configuration of the blower 22 being similar to the first blower 12 and the second blower 13, and will not be described again herein.

In some embodiments, said blower 22 can also be configured as centrifugal type.

Figure 4:
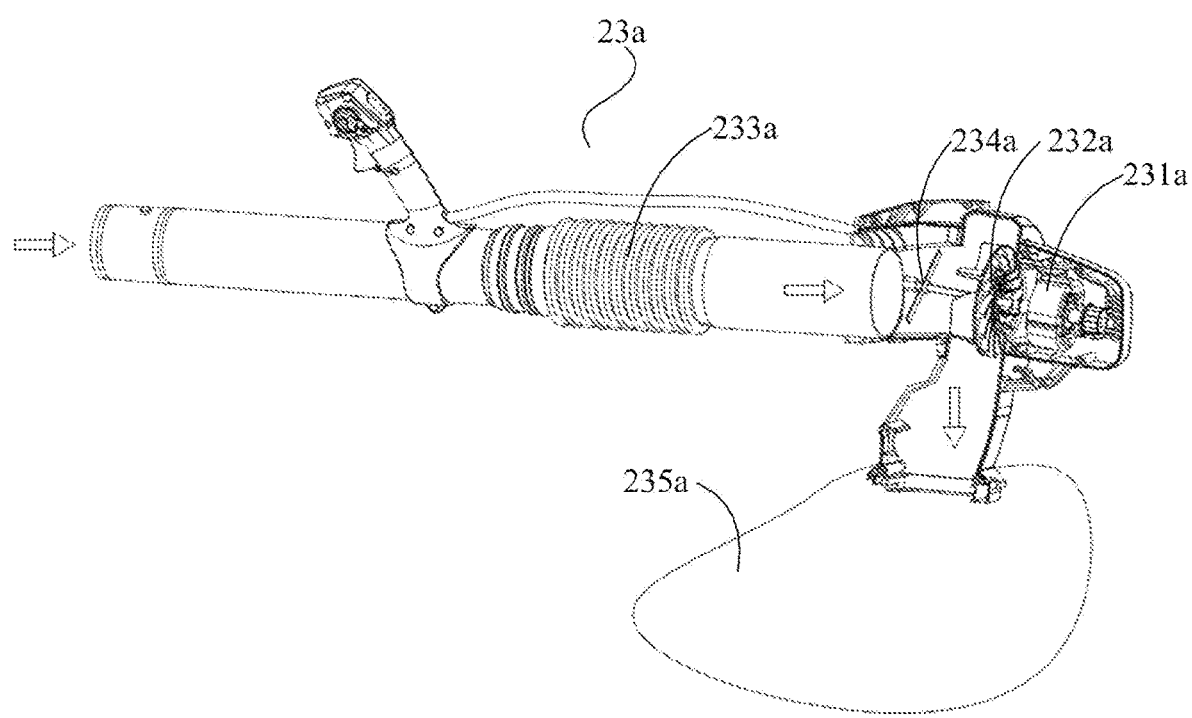
FIG. 4 is a structure diagram of a leaf suction machine of a tool of blowing & sucking provided by an embodiment of the present invention.

Referring to FIG. 4, in some embodiments, said leaf suction machine 23 is configured as centrifugal leaf suction machine 23a. Specifically, the centrifugal leaf suction machine 23a comprises a motor 231a, a centrifugal fan blade 232a, and a straw component 233a. the motor 231a is electrically connected to the battery pack 212 to convert the electrical energy provided by the battery pack 212 to mechanical energy, the centrifugal fan 232a is connected to the motor 231a to convert the mechanical energy of the motor 231a into air stream to inhale through the straw component 233a to suck up foreign objects.

In some embodiments, said centrifugal leaf suction machine 23a is further equipped with a blade 234a, to chop the foreign objects sucked up. Said blade 234a may be disposed coaxially with the centrifugal fan 232a to be rotated by the motor 231a to chop foreign objects (e.g., leaves) sucked by the straw component 233a to prevent foreign objects blocking the air duct.

In some embodiments, said blade 234a is disposed upstream of the centrifugal fan 232a in accordance with the flow direction of the airflow (as indicated by the arrow in FIG. 4).

In some embodiments, said centrifugal leaf suction machine 23a is further equipped with a collection bag 235a, to collect the foreign objects (such as leaves) sucked up.

In some embodiments, said collecting bag 235a is disposed downstream of the blade 234a in accordance with the flow direction of the airflow.

Figure 5:
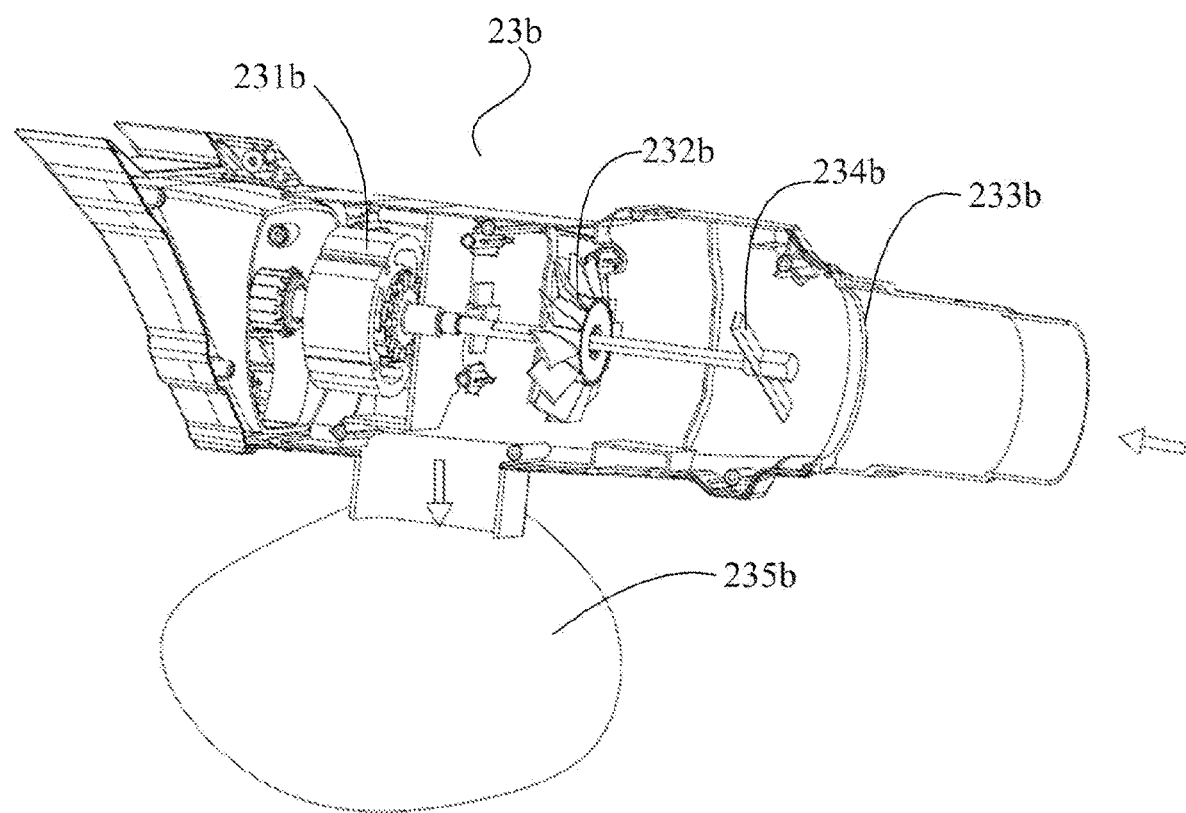
FIG. 5 is a structure diagram of a leaf suction machine of a tool of blowing & sucking provided by another embodiment of the present invention.

Referring to FIG. 5, in some embodiments, said leaf suction machine 23 is configured as an axial-flow leaf suction machine 23b. Specifically, the axial-flow leaf suction machine 23b comprises a motor 231b, an axial-flow fan 232b, and a straw component 233b. the motor 231b is electrically connected to the battery pack 212 to convert the electrical energy provided by the battery pack 212 to mechanical energy, the axial-flow fan 232b is connected to the motor 231b to convert the mechanical energy of the motor 231b into air stream to inhale through the straw component 233b to suck up foreign objects.

In some embodiments, said axial-flow leaf suction machine 23b is further equipped with a blade 234b, to chop the foreign objects sucked up. Said blade 234b may be disposed coaxially with the axial-flow fan 232b to be rotated by the motor 231b to chop foreign objects (e.g., leaves) sucked by the straw component 233b to prevent foreign objects blocking the air duct.

In some embodiments, said blade 234b is disposed upstream of the axial-flow fan 232b in accordance with the flow direction of the airflow (as indicated by the arrow in FIG. 5).

In some embodiments, said axial-flow leaf suction machine 23b is further equipped with a collection bag 235b, to collect the foreign objects (such as leaves) sucked up.

In some embodiments, said collecting bag 235b is disposed downstream of the axial-flow fan 232b in accordance with the flow direction of the airflow.

Continue to refer to FIG. 3, in some embodiments, said blower 22 is further equipped with a blower controller component 223 to control the start & stop and the blowing speed of the blower 22. Said blower 23 is further equipped with a leaf suction machine controller component 236 to control the start & stop and the suction speed of the blower 23. For the configuration of the blower controller component 223 and the leaf suction machine controller component 236, refer to the above descriptions relating to the first controller component 123 and the second controller component 133, and details will not be described herein.

It can be seen that the blow-suck combined work apparatus 20 provided by the embodiment of the present invention can realize both the blowing action and the suction action, and the implementation and controlling of the blowing and sucking operation are independent of each other. Therefore, the blow-suck combined tool 20 provided by the embodiment of the invention has advantages such as high work efficiency, powerful function.

According to the embodiment shown in FIG. 1 to FIG. 5, it can be seen that the embodiment of the present invention provides a backpack tool apparatus (for example, said backpack leaf suction machine 10 and the blow-suck combined tool 20). It combines different tools (for example, the first blower 12 and the second blower 13, the blower 22 and the leaf suction machine 23) to simultaneously realize different operations or functions.

Specifically, the backpack tool apparatus comprises: a backpack assembly (e.g., said backpack assembly 11 or said backpack assembly 21), wherein said backpack assembly comprises: a casing (e.g., said casing 111 or said casing 211) and a battery pack received in said casing (e.g., the battery pack 112 or the battery pack 212); a first tool (e.g., said first blower 12 of said backpack blower 10 or said blower 22 of said blow-suck combined tool 20); and a second tool (e.g., said second blower 13 of said backpack blower 10, or said leaf suction machine 23 of said blow-suck combined tool 20). Said first tool and second tool are connected to the backpack assembly and electrically connected to the battery pack.

In some embodiments, said first tool can be configured as any one of the following: a blower, a leaf suction machine, a grass cutter or a chain saw.

In some embodiments, said second tool can also be configured as any one of the following: a blower, a leaf suction machine, a grass cutter or a chain saw.

In some embodiments, said first tool and said second tool can be configured as the same structure. For example, both said first tool and said second tool are configured as a blower, and said first tool can be configured as a high-speed blower to remove heavy objects such as stones, said second tool is configured as a high-volume blower (see the embodiment shown in FIG. 1) to remove large objects.

In some embodiments, at least one of said first tool and said second tool can be configure to detachably connected to said backpack assembly, therefore, different operations and functions can be implemented by replacing different tools, in order to improve the applicability of the backpack assembly. For example, when it is required to implement a blowing action, it can be realized by installing a blower on the backpack assembly, and when an air suction action is required, the user only needs to remove the blower from the backpack assembly and install the leaf suction machine on the backpack assembly.

Figure 6:
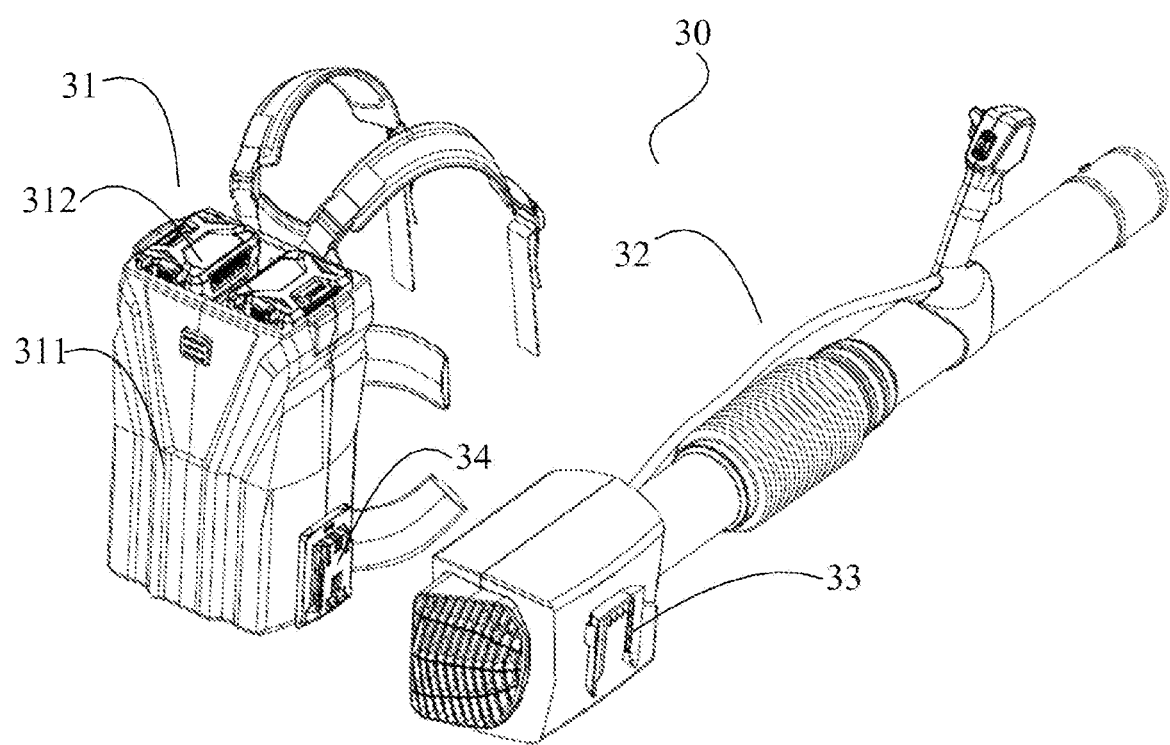
FIG. 6 is a structure diagram of detachable tool provided by an embodiment of the present invention.

Referring to FIG. 6, an embodiment of the present invention provides a detachable tool 30. Said detachable tool 30 comprises: backpack assembly 31 and tool 32.

Said backpack assembly 31 comprises a casing 311 and a battery pack 312 received in the casing 311.

Said tool 32 is suitable to be detachably mounted on said casing 311 of said backpack assembly 31. Said tool 32 comprises a motor (refer to the motor 231a in FIG. 4 and the motor 231b in FIG. 5). When said tool 32 is mounted on said casing 311 of said backpack assembly 31, the motor of said tool 32 is applicable to be electrically connected to said battery pack 312, that is, the power source of said tool 32 is the battery pack 312 received in said casing 311, so that the force applied to the user's arm can be reduced.

In some embodiments, said tool 32 can be configured as: a blower. For example, the tool 32 can be configured as said first blower 12 in FIG. 1, said second blower 13 in FIG. 1, or said blower 22 in FIG. 3.

In some embodiments, said tool 32 can be configured as: a leaf suction machine. For example, said tool 32 can be configured as said leaf suction machine 23 in FIG. 3.

In some embodiments, said tool 32 can also be configured as: a grass cutter or a chain saw.

Continue to refer to FIG. 6, in some embodiments, in order to detachably mount the tool 32 on the casing 311, the tool 32 is provided with: a first connector 33, said casing 311 of said backpack assembly 31 is provided with a second connector 34, and said tool 32 can be detachably mounted on said casing 311 through said first connector 33 and said second connector.

Figure 7:
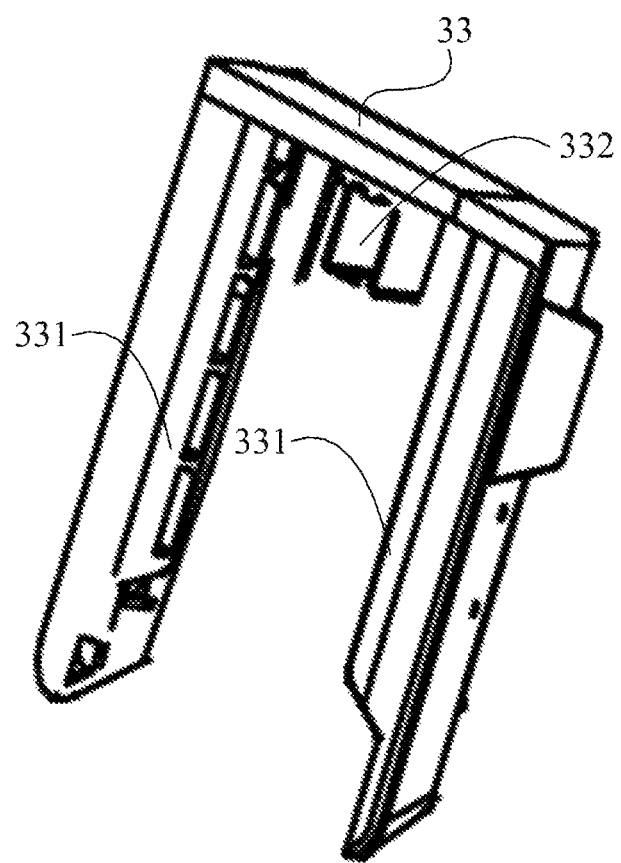
FIG. 7 is a structure diagram of a first connector of a detachable tool provided by an embodiment of the present invention.
Figure 8:
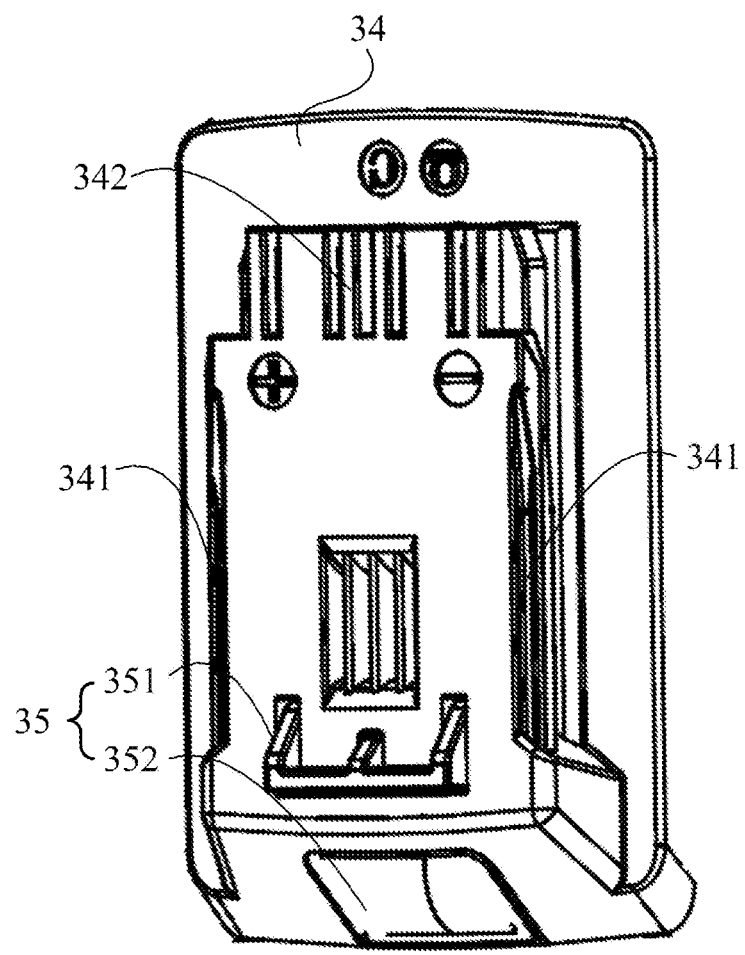
FIG. 8 is a structure diagram of a second connector of a detachable tool provided by an embodiment of the present invention.
Figure 9:
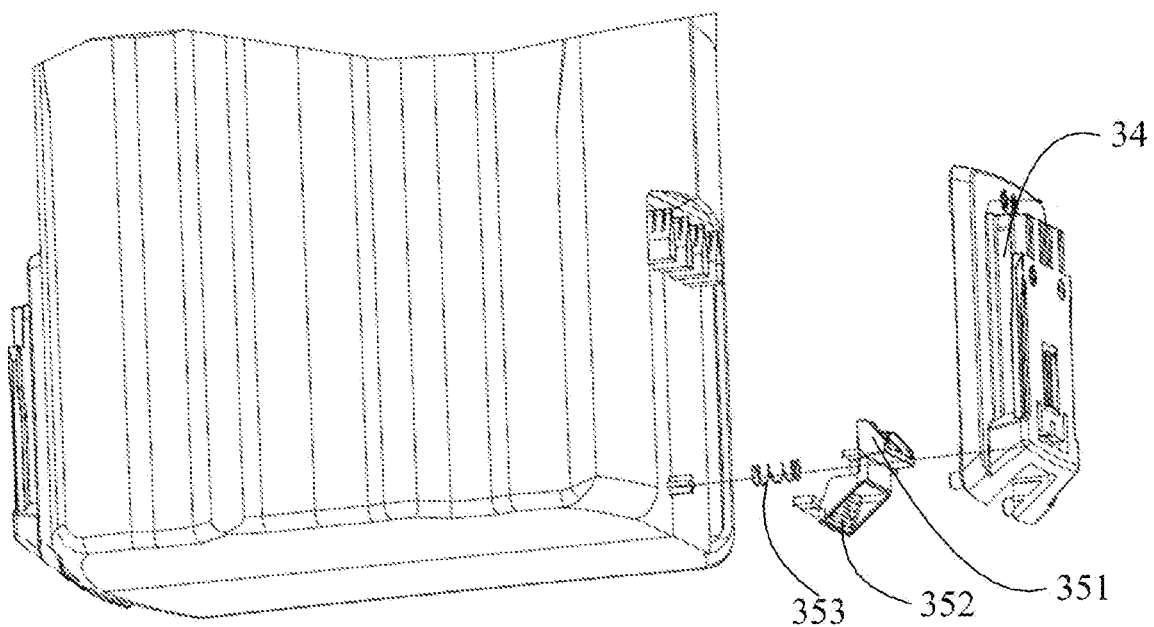
FIG. 9 is an exploded diagram of a second connector of a detachable tool provided by an embodiment of the present invention.

Specifically, as shown in FIG. 7 to FIG. 9, a guide rail 331 is formed on said first connector 33, and a guide groove 341 is formed on the second connector 34, and the guide rail 331 can be received in the guide groove 341, and can slide along the guide groove 341. The first end of the guide groove 341 has an opening such that the guide rail 331 can be inserted into the guide groove 341 through the opening, or the guide rail 331 can be disengaged from the guide groove 341 through the opening. Thereby, the tool 32 and the backpack assembly 31 are detachably connected through the guide rail 331 and the guide groove 341, and when the guide rail 331 is inserted into the guide groove 341 through the opening of the guide groove 341, the inner wall of the guide groove 341 only allows the guide rail 331 to move along the extending direction of the guide groove 341, limiting the movement of the guide rail 331 in other directions, so that the guide rail 331 is confined in the guide groove 341, and the tool 32 is mounted on the casing 311 of the backpack assembly 31; when the guide rail 331 is slid along the guide groove 341 to disengage the guide rail 331 from the guide groove 341, the tool 32 can be removed from the casing 311 of the backpack assembly 31. In this way, a detachable connection between the tool 32 and the backpack assembly 31 can be realized by the guide rail 331 and the guide groove 341.

It should be noted that although in the embodiment shown in FIG. 6, the guide rail 331 is disposed on the tool 32, and the guide groove 341 is disposed on the backpack assembly 31, but in some embodiments, the guide groove 341 can also be disposed on the tool 32, and the guide rail 331 can be disposed on the backpack assembly 31.

When the guide rail 331 is inserted into the guide groove 341, the guide rail 331 can still move along the extending direction of the guide groove 341 under the action of an external force, and therefore, the guide rail 331 may accidentally disengage from the guide groove 341, causing the tool 32 to accidentally disengage from the backpack assembly 31, which may cause accidental injury to the user. Therefore, in order to prevent the guide rail 331 from moving along the guide groove 341 when the guide rail 331 is inserted into the guide groove 341, to fix the relative position between the tool 32 and the backpack assembly 31, in some embodiments, the backpack tool apparatus 30 is further provided with a locking part 35, and the locking part 35 is applicable to fix the relative position between the tool 32 and the backpack assembly 31.

Specifically, the locking part 35 comprises: a locking protuberance 351 and a locking groove (not shown), which are respectively disposed on the backpack assembly 31 and the tool 32, that is, if the locking protuberance 351 is disposed on the tool 31, the locking groove is disposed on the tool 32, and if the locking protuberance 351 is disposed on the tool 32, the locking groove will be disposed on the backpack assembly 31. In this way, said locking protuberance 351 is received in said locking groove when said rail 331 is inserted into the guide groove 341 to fix the relative position between said tool 32 and said backpack assembly 31.

In some embodiments, said locking part further comprises: a release button 352, to drive the locking protuberance 351 to separate from said locking groove. Specifically, take the locking protuberance 351 is disposed on the backpack assembly 31 as an example, and the locking protuberance 351 is movably disposed on the casing 311 of the backpack assembly 31 through the elastic part 353, and the release button 352 is connected to the locking protuberance 351. As a result, when the release button 352 is pressed, the elastic part 353 is compressed, and the locking projection 351 is moved away from the direction in which the locking groove is shown until it is disengaged from the locking groove; When release the release button 352, the external force disappears, and the elastic part 353 returns to the shape before being compressed, thereby pushing the limit stop 35 to be reset. In this way, when the guide rail 331 is inserted into the guide groove 341, the locking protuberance 351 of the locking part 35 is applicable to be received in the locking groove on the tool 32, to prevent the guide rail 331 from sliding relative to the guide groove 341, thereby fixing the relative position between the tool 32 and the illustrated backpack assembly 31; When the tool 32 needs to be detached from the backpack assembly 31, the locking protuberance 351 can be disengaged from the illustrated locking groove by pressing the release button 352, the guide rail 331 is slidable along the guide groove 341 until the guide rail 331 is disengaged from the guide groove 341, that is, the tool 32 is detached from the backpack assembly 31.

Figure 10:
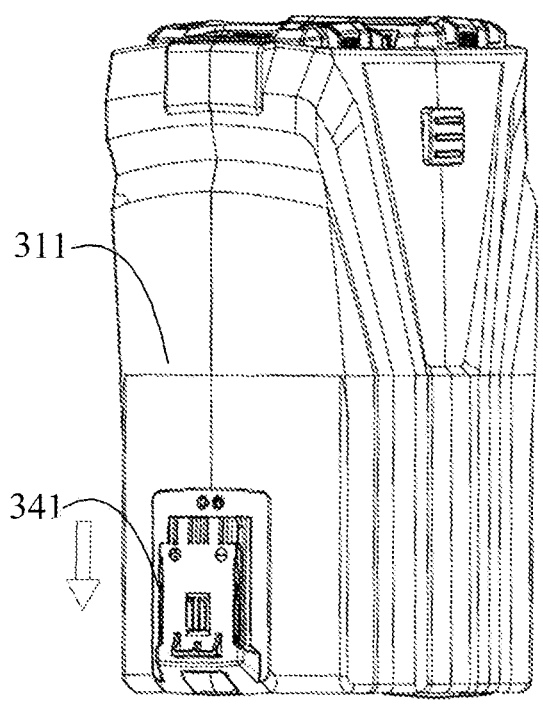
FIG. 10 is a connection diagram of a second connector of a detachable tool with backpack assembly provided by an embodiment of the present invention.
Figure 11:
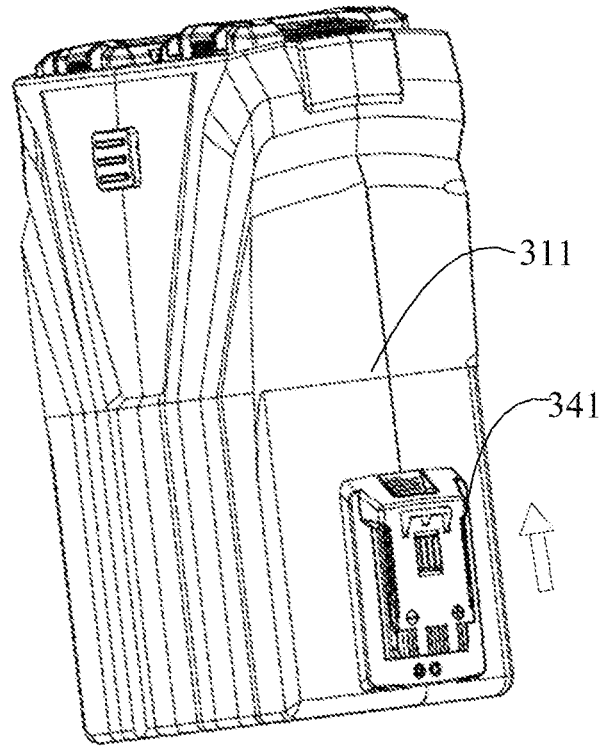
FIG. 11 is a connection diagram of a second connector of a detachable tool with backpack assembly provided by another embodiment of the present invention.

In some embodiments, the guide groove 341 is disposed on the casing 311 of the backpack assembly 31, and the guide groove 341 is disposed to extend in a longitudinal direction as shown in FIG. 10 and FIG. 11. The "longitudinal direction" refers to the up and down direction when the casing 311 is placed on the human body. At the same time, the opening of the guide groove 341 may be disposed to face upward (as shown in FIG. 10), and is also disposed to face downward (as shown in FIG. 11). When the guide groove 341 extends in the longitudinal direction and the opening faces upward, the guide rail 331 is applicable to be inserted into the guide groove 341 from top to bottom (in the direction indicated by an arrow in FIG. 10). When the guide groove 341 extends in the longitudinal direction and the opening faces downward, the guide rail 331 is applicable to be inserted into the guide groove 341 from bottom to top (in the direction indicated by an arrow in FIG. 11).

Figure 12:
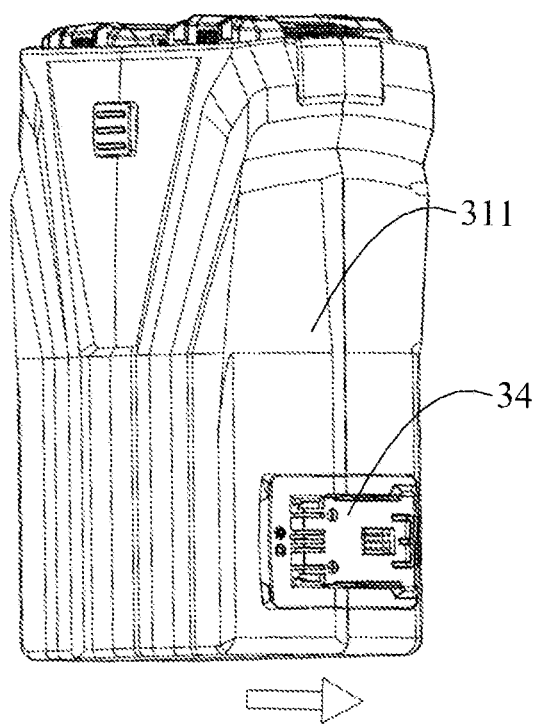
FIG. 12 is a connection diagram of a second connector of a detachable tool with backpack assembly provided by another embodiment of the present invention.
Figure 13:
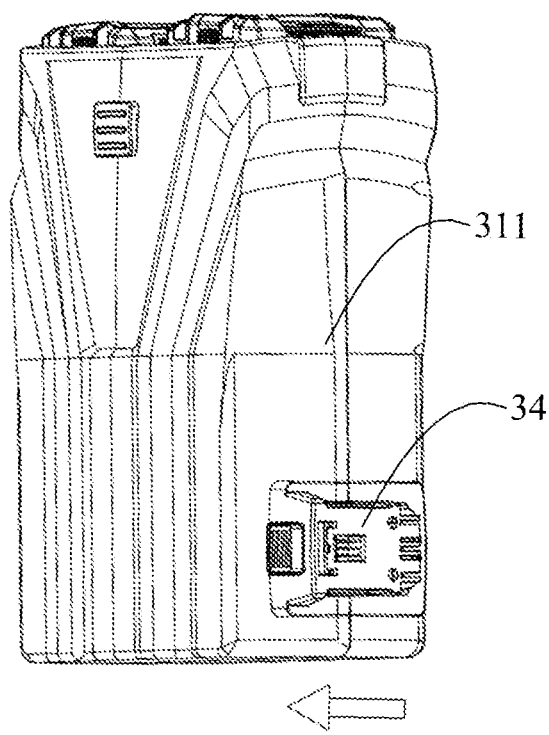
FIG. 13 is a connection diagram of a second connector of a detachable tool with backpack assembly provided by another embodiment of the present invention.

In some embodiments, the guide groove 341 is disposed on the casing 311 of the backpack assembly 31, and the guide groove 341 extends in a horizontal direction as shown in FIG. 12 and FIG. 13. The "horizontal direction" refers to the forward and backward directions when the casing 311 is placed on the human body. At the same time, the opening of the guide groove 341 may be disposed to face backward (as shown in FIG. 12), and is also disposed to face forward (as shown in FIG. 13). When the guide groove 341 extends in the horizontal direction and the opening faces backward, the guide rail 33 is applicable to be inserted into the guide groove 341 from back to front (in the direction indicated by an arrow in FIG. 12). When the guide groove 341 extends in the horizontal direction and the opening faces forward, the guide rail 33 is applicable to be inserted into the guide groove 341 from front to back (in the direction indicated by an arrow in FIG. 13).

It is to be noted that, in FIG. 10 to FIG. 13, the guide groove 341 is disposed on the casing 311 as an example, but in practice, the guide rail 331 may be disposed on the casing 311, and the guide rail 331 may be configured to extend in a lateral direction or in a longitudinal direction.

Continue to refer to FIG. 7 to FIG. 9, in some embodiments, a male 332 and female plug 342 are respectively equipped on said backpack assembly 31 and said tool 32, and when said rail 331 is inserted into said guide groove 341, said male plug 332 is in contact with said female plug 342 to electrically connect said battery pack 312 and said tool 32. Specifically, the male plug 332 can be disposed on the first connector 33, and the female plug 342 can be disposed on the second connector 34. For example, when the first connector 33 is disposed on the tool 32, and the second connector 34 is disposed on the backpack assembly, the male plug 332 of the first connector 33 is electrically connected with the power assembly (e.g., a motor) of the tool 32, and the female plug 342 on the second connector 34 is electrically connected to the battery pack 312 in the backpack assembly 31. In this way, when said rail 331 is inserted into said guide groove 341, said male plug 332 is in contact with said female plug 342 to electrically connect said battery pack 312 and the power assembly of said tool 32, to realize the electrical connection between the tool 32 and said battery pack 312.

Figure 14:
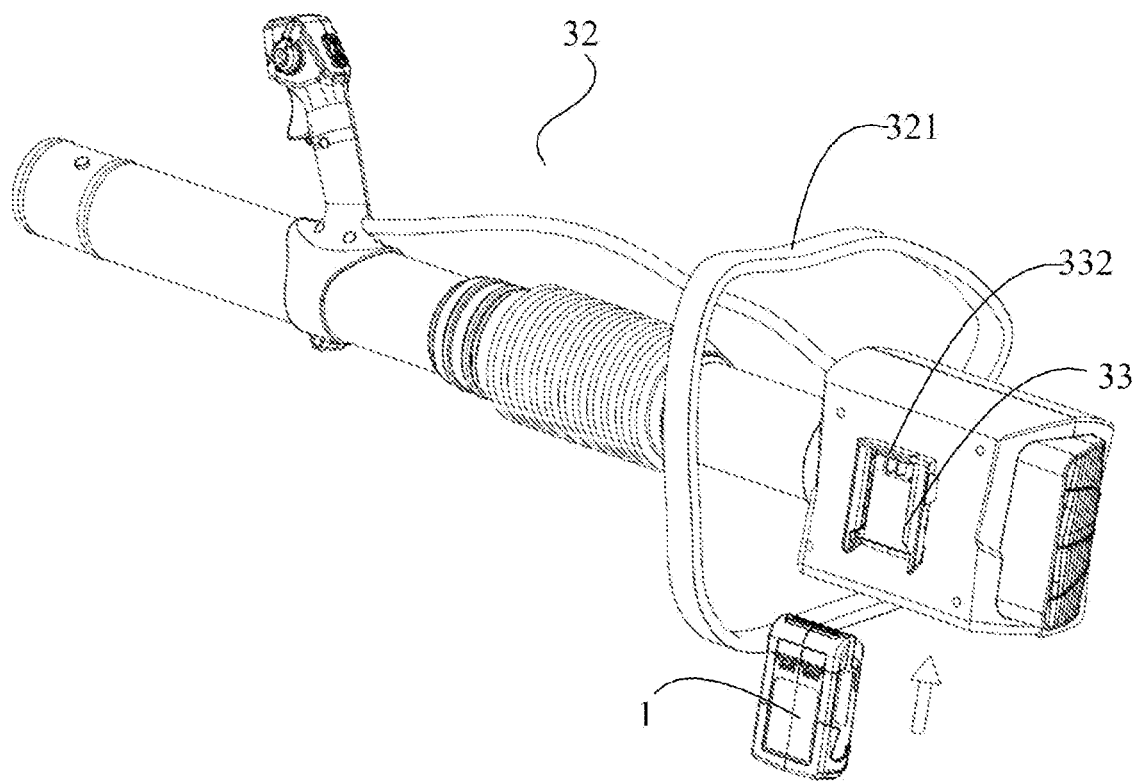
FIG. 14 is a structure diagram of a tool of a detachable tool provided by another embodiment of the present invention.

In some embodiments, as shown in FIG. 14, the tool 32 is provided with the first connector 33, and the first connector 33 is provided with the female plug 332. In this way, the tool 32 is suitable to externally connect a battery pack 1 through the female plug 332. In addition, the tool 32 can further be provided with a strap 321 for carrying the tool 32 on human bodies to relieve the force applied on the user's arm. Thus, when the tool 32 is detached from the backpack assembly 31, it can be operated independently by the external battery pack 1, and can be carried by the strap 321 to the human body to relieve the force applied on the user's arm.

It should be noted that, in the embodiment shown in FIG. 14, the tool 32 is equipped with: the first connector 33 with the female plug 332, to externally connect to the battery pack 1. But in some embodiments, the tool 32 is equipped with: the first connector 34 with the female plug 342, to externally connect with the battery pack 1.

In some embodiments, the second connector 34 or the first connector 33 is disposed on the left and right side of the backpack assembly 31 to be suitable to externally connect two tools. For example, the left and right side of the backpack assembly 31 can be respectively connected with two blowers (as shown in the embodiment of FIG. 1); the left and right side of the backpack assembly 31 can also be respectively connected with a blower and a leaf suction machine (see the embodiment illustrated in FIG. 3).

In some embodiments, the first connector 33 or the second connector 34 is disposed on the left and right side of the tool 32. In this way, the user can install the tool to the left or right side of the backpack assembly as required. For example, if the user is accustomed to the right hand operation, the tool can be mounted to the right side of the backpack assembly by the first connector 33 or the second connector 34 located on the left side of the tool, if the user is accustomed to the left-hand operation, the tool can be mounted to the left side of the backpack assembly through the first connector 33 or the second connector 34 located on the right side of the tool.

Figure 15:
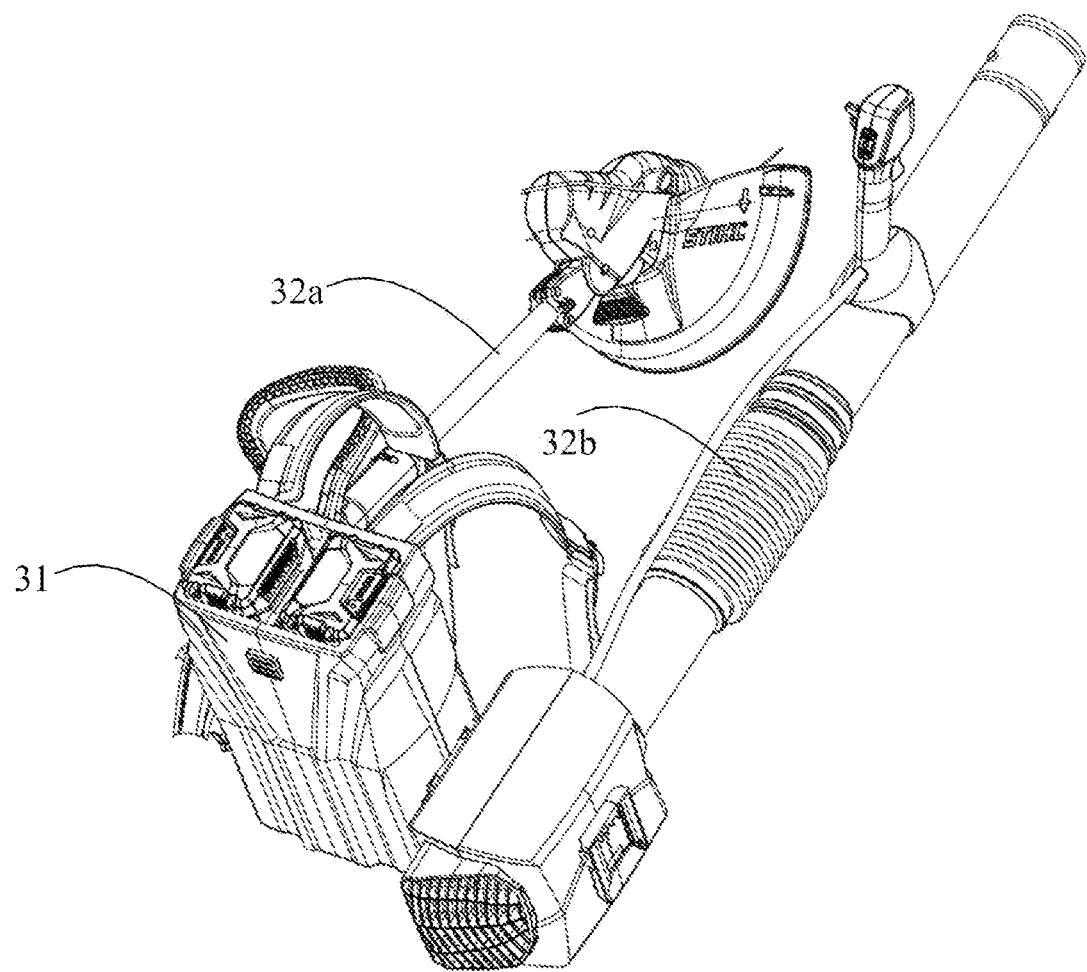
FIG. 15 is a structure diagram of detachable tool provided by another embodiment of the present invention.

Thus, the detachable tool provided by the embodiment of the present invention can implement different operations and actions by installing different tools on the backpack assembly 31. For example, as shown in FIG. 15, a grass cutter 32a can be mounted on the left side of the backpack assembly 31, and a blower 32b is installed on the right side, to simultaneously perform the cutting and blowing action. In addition, the user can also mount the grass cutter 32a on the right side of the backpack assembly 31 according to specific needs, and install the blower 32b on the left side of the backpack assembly.

Figure 16:
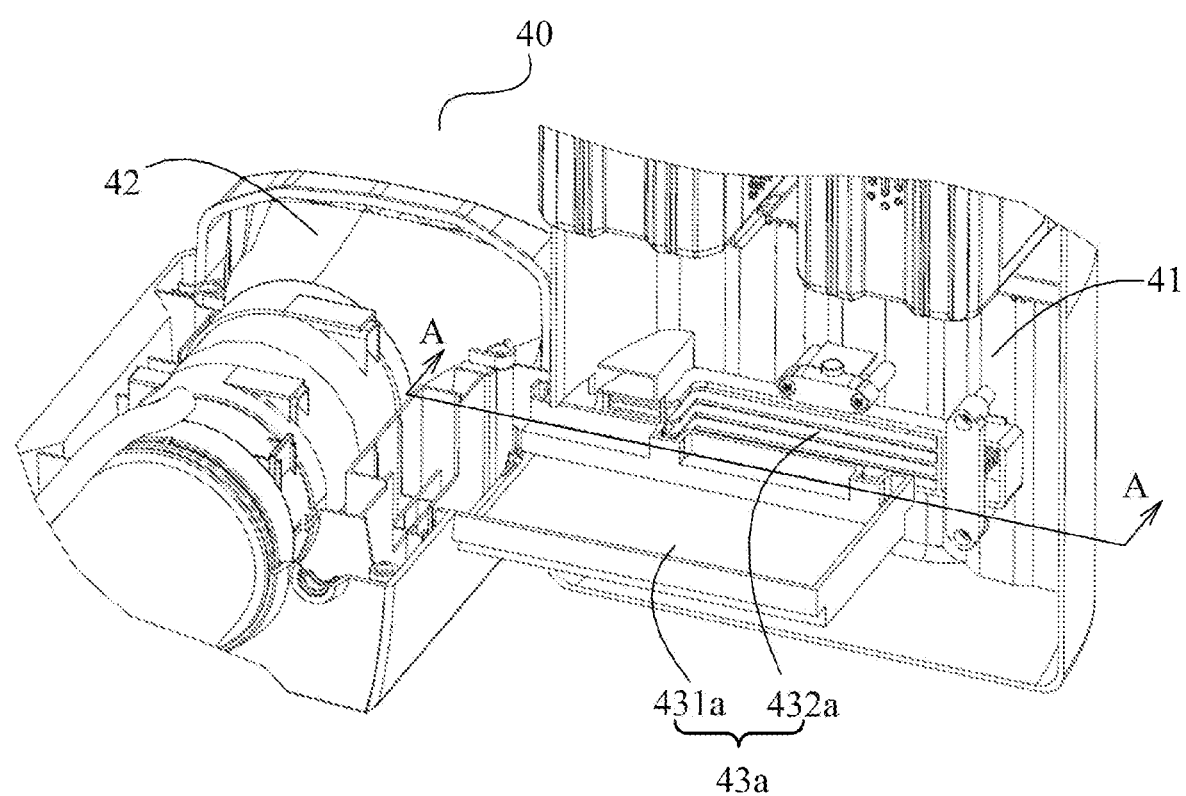
FIG. 16 is a partial structure diagram of an adjustable tool provided by an embodiment of the present invention.
Figure 17:
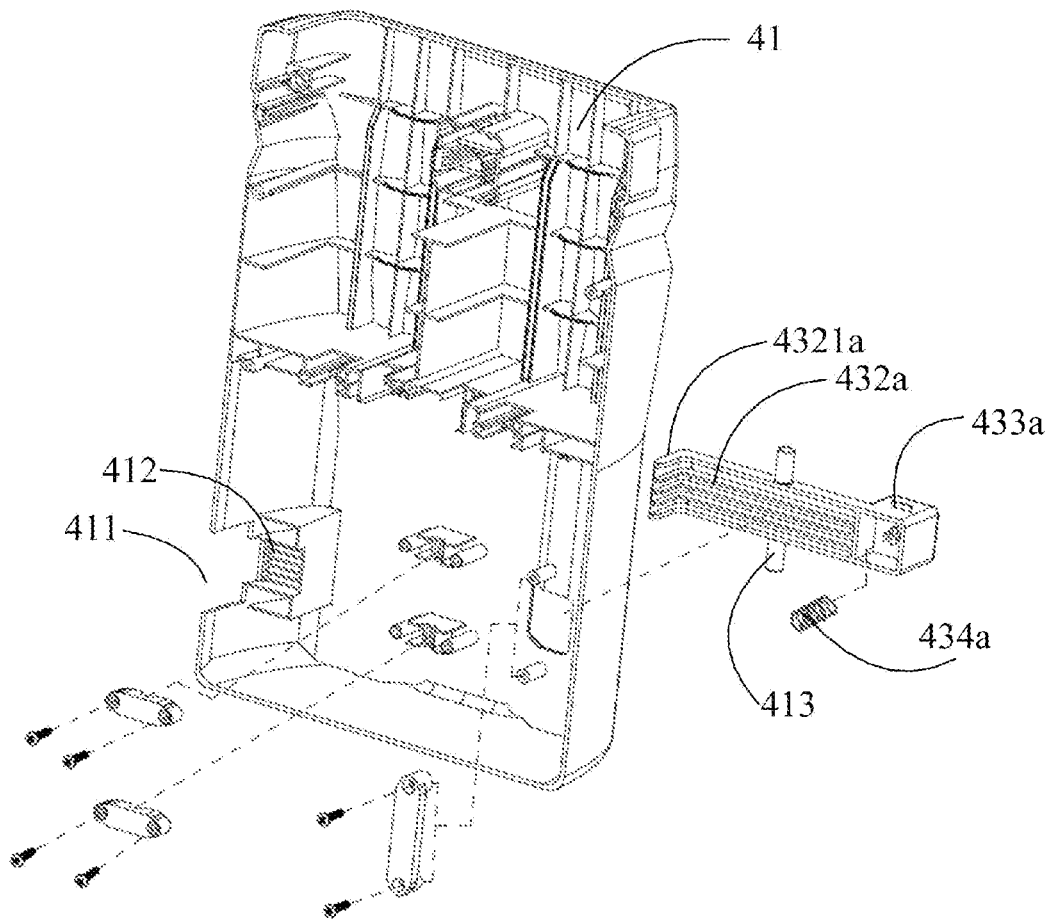
FIG. 17 is an exploded view of the backpack assembly of the adjustable tool in FIG. 16.
Figure 18:
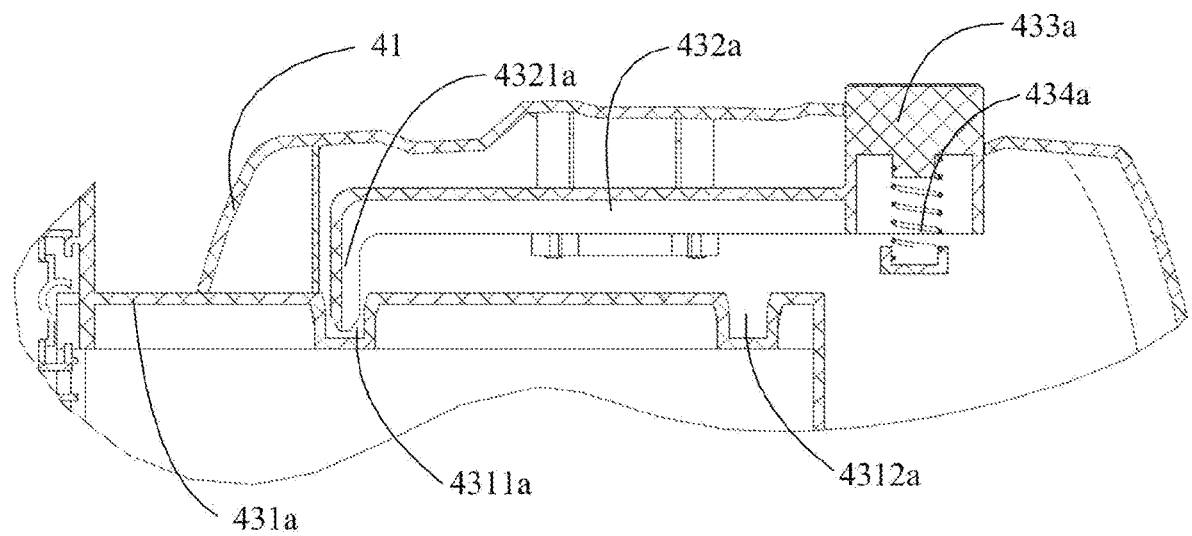
FIG. 18 is a cross-sectional view of an adjustable tool provided by an embodiment of the present invention along line AA of FIG. 16.

Referring to FIG. 16 to FIG. 18, an embodiment of the present invention also provides a distance adjustable tool 40. Said distance adjustable tool 40 comprises: backpack assembly 41 and tool 42.

It is to be noted that only the connected portion of the backpack assembly 41 and the tool 42 are shown in FIG. 16. The overall configuration of the backpack assembly 41 and the tool 42 can be referred to the corresponding description of the backpack assembly and the tool with referring to the above embodiments, and details are not described herein again.

The tool 40 provided in this embodiment further comprises: a distance adjusting assembly, disposed between the tool 42 and the backpack assembly 41, and said tool 42 is connected to the backpack assembly 41 through the distance adjusting assembly, said assembly is used to switch the tool 42 between different positions, to adjust the distance between the tool 42 and the backpack assembly 41. Said distance adjusting assembly composes: a neck, an adjustable portion, a driving portion, and a resetting part; said neck is formed with at least a first groove and a second groove; a protrusion formed on the adjustable part, the protrusion being received in the first groove to fix the tool in the first position; said driving portion is applicable to drive the adjustable portion moving to disengage the protrusion on the adjustable portion from said first groove; when the protrusion on said adjustable portion is disengaged from said first groove, the tool can move relatively to the backpack assembly such that the protrusion on the adjustable part is aligned with a second groove on the neck; the resetting part can drive the driving portion to be reset such that said protrusion on the adjustment portion is received within the second groove to secure the tool to the second position.

Specifically, referring to FIG. 16-18, in some embodiments, the distance adjusting assembly is configured as the distance adjusting assembly 43a. Said distance adjusting assembly 43a comprises a neck 431a, an adjustable portion 432a, a driving portion 433a, and a reset part 434a.

Said neck 431a is fixed to one side of the tool 42 and extends outward from the tool 42. An opening 411 is formed on the casing of the backpack assembly 41, and a guiding structure 412 is formed at the opening 411. Said neck 431a can be inserted into the casing of the backpack assembly through the opening 411 and can move along the guiding structure 412. A plurality of spaced grooves are formed on the groove portion 431a, such as a first groove 4311a and a second groove 4312a.

A protrusion 4321a is formed on the adjustable portion 432a. When the neck 431a moves along the guiding structure 412 until the first groove 4311a is aligned with the protrusion 4321a, the protrusion 4321a can be received in the first groove 4311a, thereby the tool 42 is fixed in the first position. Further, the adjustable portion 432a is provided as a rotatable structure, that is, the adjustable portion 432a is rotatable mounted to the casing of the backpack assembly 41 through a rotating shaft 413. In this way, when the adjusting portion 432a is rotated to disengage the protrusion 4321a from the first groove 4311a, and the neck 431a is moved along the guiding structure 412 such that the second groove 4312a is aligned with the protrusion 4321, the protrusion 4321a can be received in the second groove 4312a to secure the tool 42 in the second position.

In some embodiments, the adjusting portion 432a is disposed within the casing of the backpack assembly 41. At this time, the driving portion 433a is provided as a drive button connected to the adjusting portion 432a. The drive button 433a comes out the casing of the backpack assembly 41, and the user can drive the adjustable portion 432 to rotate by pressing the drive button 433a, so that the protrusion 4321a is disengaged from the first groove 4311a, so as to switch the tool 42 between the first position and the second position.

In some embodiments, the neck 431 is formed with more than two grooves. At this time, the tool 42 can be switched between more than two positions. In practice, the number of grooves can be set to adjust the tool 42 between a plurality of positions, depending on the particular needs.

Figure 19:
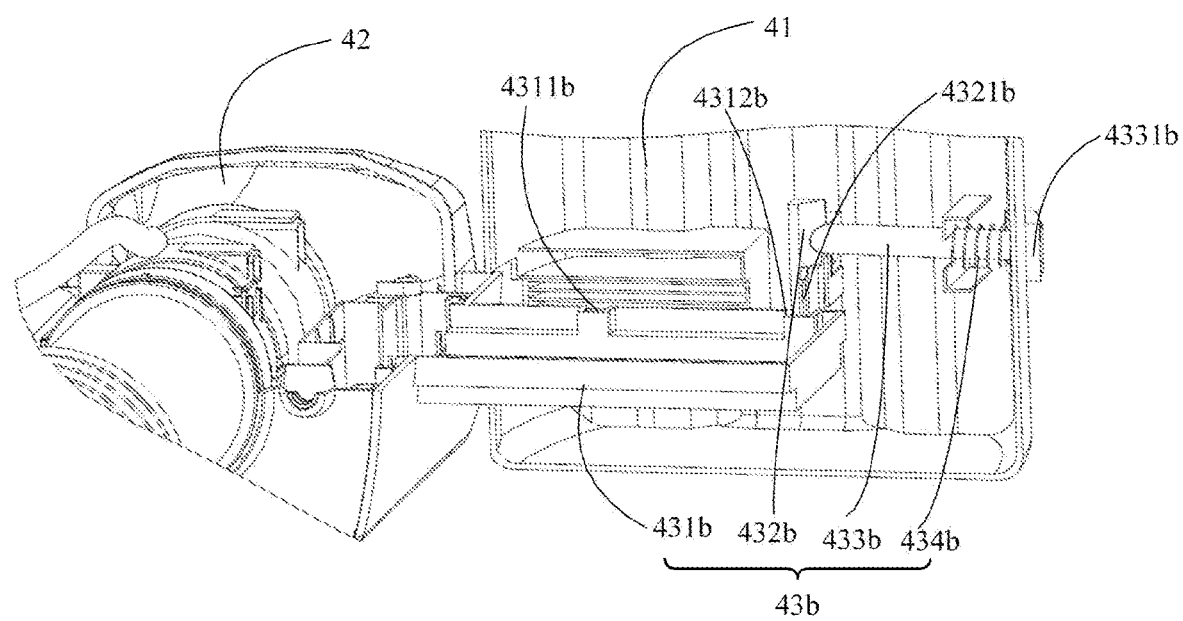
FIG. 19 is a partial structure diagram of an adjustable tool provided by another embodiment of the present invention.

Referring to FIG. 19, in some embodiments, the distance adjusting assembly is configured as the distance adjusting assembly 43b. Said distance adjusting assembly 43b comprises a neck 431b, an adjustable portion 432b, a driving part 433b, and a reset part 434b.

Similar to the distance adjusting assembly 43a, in the present embodiment, said neck 431b is fixed to one side of the tool 42 and extends outward from the tool 42. An opening is formed on the casing of the backpack assembly 41, and a guiding structure is formed at the opening. Said neck 431b can be inserted into the casing of the backpack assembly 41 through the opening and can move along the guiding structure. A plurality of spaced grooves are formed on the groove portion 431b, such as a first groove 4311b and a second groove 4312b.

A protrusion 4321b is formed on the adjustable portion 432b. When the neck 431b moves along the guiding structure until the second groove 4312b is aligned with the protrusion 4321b, the protrusion 4321b can be received in the second groove 4312b, thereby the tool 42 is fixed in the second position. Said adjustable portion 432b is configured as a movable structure. For example, the adjustable portion 432b can be abutted against the casing of the backpack assembly 41 by a spring. The driving part 433b is configured as a driving rod, one end of the driving rod 433b is abutted on the adjustable portion 432b, and the other end is provided with a driving button 4331b. When the driving button 4331b is pressed, the driving rod 433 moves to push the adjustable portion 432b to move such that the protrusion 4321b on the adjustable portion 432b disengaging from the second groove 4312b. At this time, the backpack assembly 42 can be moved until the first groove 4311b on the neck 431b is aligned with the protrusion 4321b, and the protrusion 4321b is received in the first groove 4311b, so as to secure the tool 42 in the first position. Thus, the tool 42 can be switched between the first position and the second position by the distance adjusting assembly 43.

In some embodiments, the driving direction of the driving rod 433b is different from the moving direction when the protrusion 4321b is disengaged from the groove. For example, in the embodiment shown in FIG. 19, the driving rod 433b is disposed at the side (for example, the left side or the right side) of the backpack assembly, when the driving button 4331b is pressed, the driving rod 433b will move side-to-side, and the adjusting portion 432b needs to move backward and forward to make the protrusion 4321b to separate from the second groove 4312b, and the surface that the adjustable portion 432b in contact with the driving rod 433b is designed as a slope. In this way, when the driving button 4331b is pressed, the force applied by the driving rod 433b to the adjustable portion 432b has a component force in the front-rear direction, so that the adjusting portion 432b can be pushed forward and backward, so that the protrusion 4321b on the adjustable portion 432b will disengage from the second groove 4312b.

In some embodiments, the direction of movement of the driving rod 433b may also be set to be the same as the direction of motion when the protrusion 4321b is disengaged from the groove. For example, in the embodiment shown in FIG. 20, the driving rob 433b may be disposed in the front-rear direction. The invention does not limit this as long as the driving rod 433 can push the adjusting portion 432b to move, to make the protrusion 4321b on the adjustable portion 432b disengaging from the second groove 4312b.

Thus, when in use, if users press the driving button 433b, the tool 42 can be switched between the first position and the second position.

Figure 20:
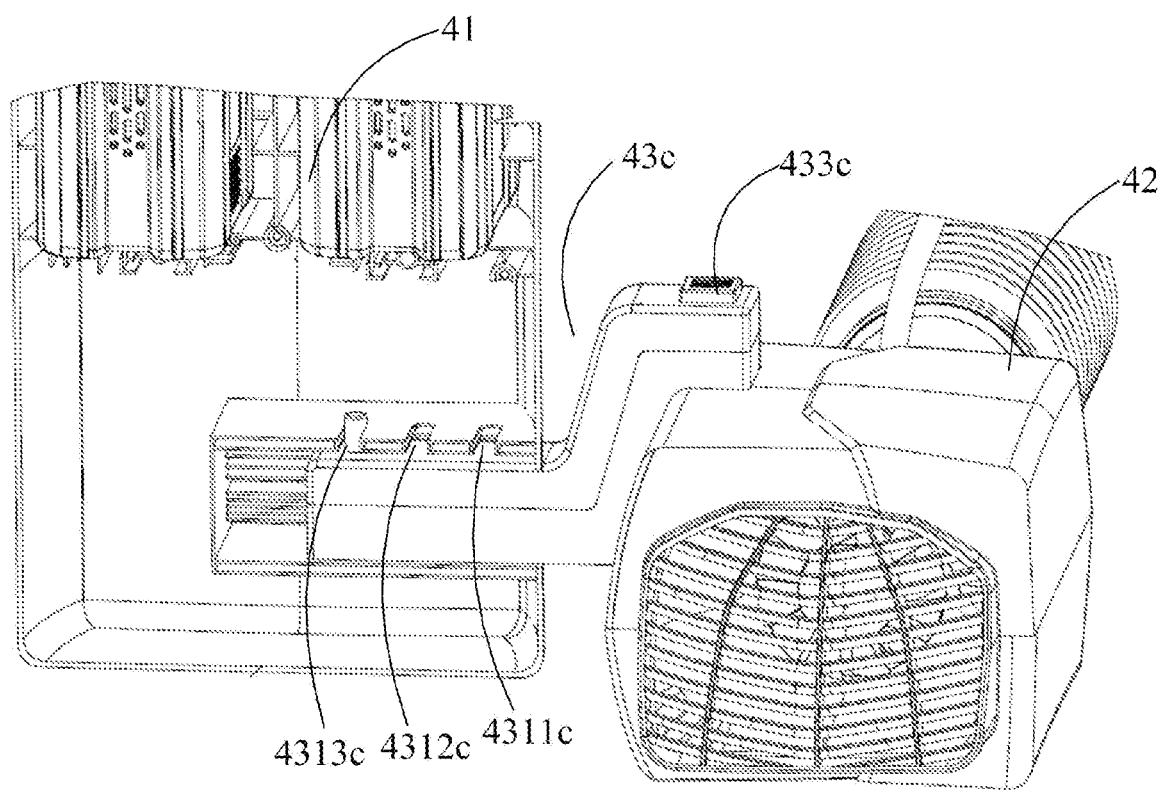
FIG. 20 is a partial structure diagram of an adjustable tool provided by another embodiment of the present invention.
Figure 21:
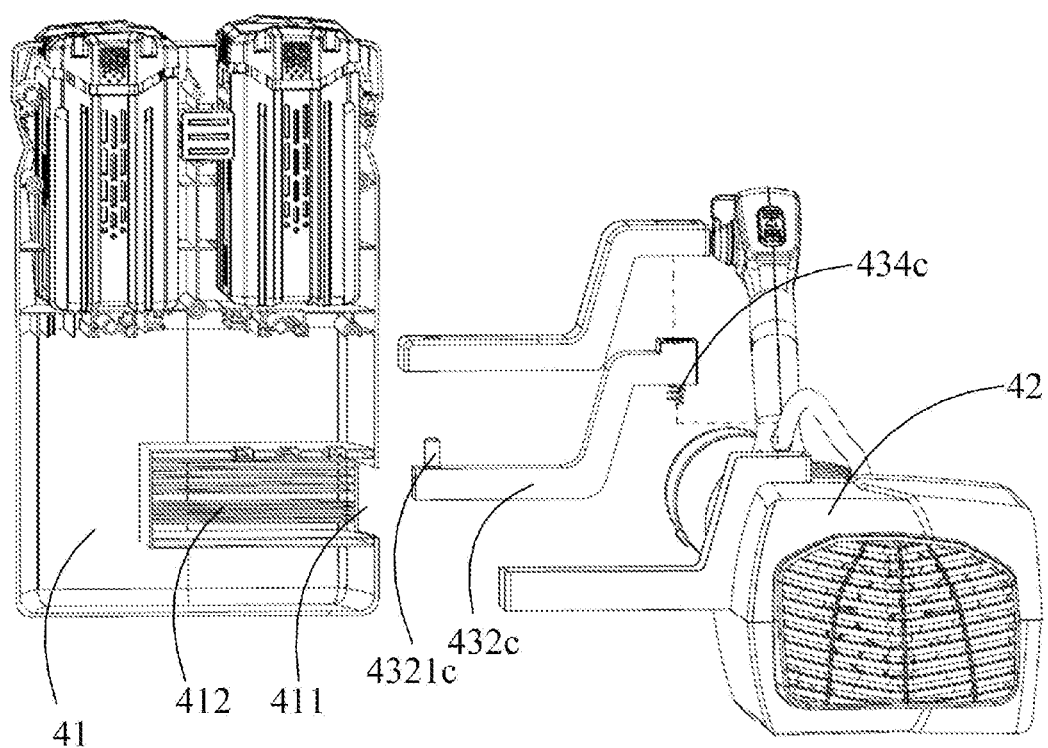
FIG. 21 is a partial structure exploded view of the backpack assembly of the adjustable tool in FIG. 20.

Referring to FIG. 20 and FIG. 21, in some embodiments, the distance adjusting assembly is configured as the distance adjusting assembly 43c. Said distance adjusting assembly 43c comprises a neck portion 431c, an adjustable portion 432c, a driving portion 433c, and a reset part 434c.

Said neck portion 431c is formed on the casing of the backpack assembly 41, and a first groove 4311b, a second groove 4312b and a third groove 4313b are formed on the neck portion 431c in proper sequence, at adequate intervals.

Said adjustable portion 432c is connected to the tool 42. A protrusion 4321c is formed on the adjustable portion 432c. Said adjustable portion 432c is movable relative to the neck portion 431c such that the protrusions 4321c are aligned with different grooves. Specifically, the casing of the backpack assembly 41 is further provided with an opening 411 and a guiding structure 412. Said adjustable portion 432c can be inserted into the casing from the opening 411 and slides along the guiding structure 412 such that the protrusion 4321c on the adjusting portion 432c and the different grooves on the neck portion 431c are aligned and matched to secure the tool 42 in different positions.

Said adjustable portion 432c is provided as a movable structure, and in particular, the adjustable portion 432c is movably disposed on the tool 42 through an elastic component (for example, the spring 434c shown in FIG. 21) to make the protrusions 4321c on the adjustable portion 432c to disengage from the corresponding grooves through moving the adjustable portion 432c, so as to adjust the working assembly 42 between different positions.

In some embodiments, the driving portion 433c is provided as a driving button, and the driving button 433c is connected to the adjustable portion 432c. Said resetting part 434c is set as a spring. Said resetting part 434 is disposed between the driving portion and the spring base, whereby the driving button 433c and the adjustable portion 432c are integrated, and the reset spring 434c is not only applicable to movably dispose the adjustable portion 432c on the tool 42, but also make the drive button 433c to be reset.

In this embodiment, said driving button 433c is provided on said tools 42.

Although the present invention discloses the above information, the present invention is not limited thereto. Any changes and modifications may be made by those skilled in the art without departing from the spirit and scope of the invention, and the scope of the invention should be determined by the scope defined by the appended claims.

The invention claimed is:

1. A backpack tool apparatus, the tool apparatus comprising:
   a backpack assembly,
   a distance adjusting assembly coupled to the backpack assembly including:
      a neck part,
      an adjustable part,
      a driving part, and
      a resetting part, and
   a tool coupled to the distance adjusting assembly;
   wherein the tool is connected to the backpack assembly through the distance adjusting assembly, and the distance adjusting assembly is applicable to switch the tool between at least a first position and a second position to adjust the distance between the tool and the backpack assembly, and
   the neck part is formed with at least a first groove and a second groove; a protrusion formed on the adjustable part, the protrusion being received in the first groove to fix the tool in the first position; the driving part is applicable to drive the adjustable part moving to disengage the protrusion on the adjustable part from the first groove; when the protrusion on the adjustable part is disengaged from the first groove, the tool can move relative to the backpack assembly such that the protrusion on the adjustable part is aligned with a second groove on the neck part; the resetting part can drive the driving part to be reset such that the protrusion on the adjustment part is received within the second groove to secure the tool in the second position.

2. The tool apparatus of claim 1, wherein the adjustable part is configured as a rotatable structure; the driving part is configured to be a driving button which is connected on the adjustable part; and when the driving button is pressed, the adjustable part is rotated to enable the protrusion on the adjustment part to disengage from the first groove.

3. The tool apparatus of claim 2, wherein the driving button is provided on the backpack assembly.

4. The tool apparatus of claim 1, wherein the adjustable part is configured as a movable structure; the driving part is configured as a driving rod, the first end of the driving rod abuts on the adjustable part, and the second end is provided with a driving button; and when the driving button is pressed the driving rod moves to disengage the protrusion on the adjustable part from the first groove.

5. The tool apparatus of claim 4, wherein the driving button is provided on the backpack assembly.

6. The tool apparatus of claim 1, wherein the adjustable part is configured as a movable structure; the driving part is configured as a driving button; the driving button is connected with the adjustable part; and when the driving button is pressed the adjustable part moves to disengage the protrusion on the adjustable part from the first groove.

7. The tool apparatus of claim 6, wherein the driving button is provided on the tool.

8. The tool apparatus of claim 1, wherein the resetting part is configured as a resetting spring which is disposed against the driving part.

* * * * *